No. 11,929. Reissued Aug. 20, 1901.
C. E. SCRIBNER.
SUPERVISORY SIGNAL FOR TELEPHONE SWITCHBOARDS.
(Application filed July 23, 1901.)
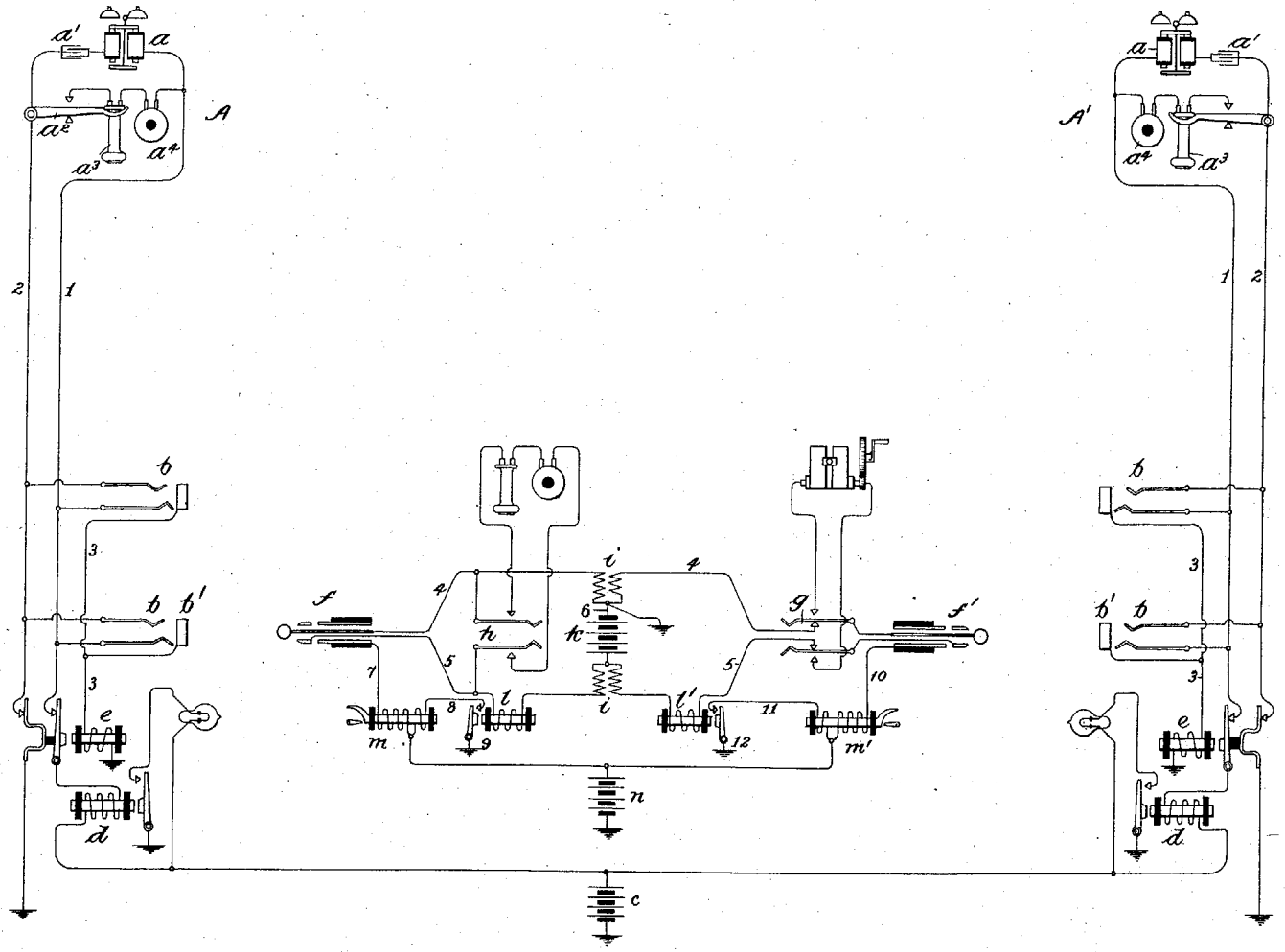
WITNESSES:
J. M. Skinkle,
H. H. Leach
INVENTOR:
CHARLES E. SCRIBNER,
BY George P. Barton.
ATTORNEY.

UNITED STATES PATENT OFFICE.

CHARLES E. SCRIBNER, OF CHICAGO, ILLINOIS, ASSIGNOR TO THE WESTERN ELECTRIC COMPANY, OF ILLINOIS.

SUPERVISORY SIGNAL FOR TELEPHONE-SWITCHBOARDS.

SPECIFICATION forming part of Reissued Letters Patent No. 11,929, dated August 20, 1901.

Original No. 676,517, dated June 18, 1901. Application for reissue filed July 23, 1901. Serial No. 69,450.

*To all whom it may concern:*

Be it known that I, CHARLES E. SCRIBNER, a citizen of the United States, residing at Chicago, in the county of Cook and State of Illinois, have invented a certain new and useful Improvement in Supervisory Signals for Telephone-Switchboards, (Case No. 462,) of which the following is a full, clear, concise, and exact description.

This invention concerns supervisory signals for association with link conductors for uniting telephone-lines in switchboards and means for controlling the signals through the agency of currents in the link conductors determined in the use of the telephones.

It is now common in the equipment of telephone-exchanges to provide at each station means for normally interrupting the line-circuit as to continuous current, with a switch for closing the line in the use of the telephone, together with relays connected with the lines in the switchboard, each responsive to current thus determined in one of the lines, and a supervisory signal controlled by each relay, one referring to each line, to indicate the condition of the lines to an attendant. The supervisory signal has commonly been interposed in a local circuit closed in the act of making connection with a line by means of the corresponding link conductor, other apparatus associated with the line being included in the same local circuit. Incandescent lamps have been used as supervisory signals, in which case the controlling-relay thereof has been arranged to shunt the lamp when the relay was excited, in order that the continuity of current through the local circuit associated with the telephone-line might be preserved; but this method of controlling the supervisory signal has been defective in that it greatly increased the potential applied to the portion of the local circuit associated with the line which commonly forms a part of the test-circuit.

The present invention contemplates the use of electromagnetic supervisory signals controlled by the relays, each signal having two windings differentially disposed, one of which is in a local circuit closed in making connection with a line and the other of which is in a branch of the local circuit controlled by the supervisory relay to be closed when the relay is excited. Thus the magnet of the supervisory relay may be rendered inert through the action of the controlling-relay without altering the electromotive force applied to the conductor associated with the line.

The invention is illustrated in the attached drawing. This drawing shows diagrammatically two telephone-stations with lines extending to switching and signaling apparatus in a telephone-switchboard and a pair of plugs and their plug-circuit for uniting the lines in the switchboard.

The line-circuit at the substation—as station A, for example—is complete as respects alternating current through the polarized signal-bell $a$ and condenser $a'$; but when the telephone-switch $a^2$ is relieved from the weight of the telephone the switch completes a circuit of low resistance between the conductors of the line through the telephones $a^3$ and $a^4$. This apparatus constitutes the ordinary equipment of a substation adapted for the automatic operation of signals in a switchboard.

The line conductors 1 and 2 from the substation are led to the line-terminal contacts of spring-jacks $b$ in the switchboard. Thence the conductor 1 is extended to one pole of a battery $c$, common to the different lines of the exchange, the magnet of a line-signal $d$ being interposed in the conductor, while the line conductor 2 is led directly to earth. The continuity of these conductors is controlled by the switch-contacts of a cut-off relay $e$. The spring-jacks are provided with the local contacts $b'$, which serve as test-rings for the spring-jacks. These contacts form multiple terminals of a grounded conductor 3, which includes the magnet-winding of cut-off relay $e$.

The link conductor before mentioned comprises connecting-plugs $f$ and $f'$, united by a plug-circuit 4 5, conductor 4 uniting the tips of the plugs and conductor 5 the ring-contacts, which are designed to make connection with the longer line-springs of the spring-jacks.

The usual calling-key $g$ is connected with the plug-circuit for applying a source of calling-current to the plug $f'$, and likewise a listening-key $h$ for connecting the operator's telephone in a bridge of the plug-circuit. The windings of a repeating-coil $i$ are interposed in the plug-circuit, two of the four windings of the coil being serially connected in each conductor of the plug-circuit. A bridge 6 of the plug-circuit is formed by uniting points on conductors 4 and 5 intermediate of the serially-connected windings in those conductors. A source of current K is included in this bridge for supplying current in the lines for operating the signals and exciting the substation-transmitters while lines are united through the agency of the plugs.

A relay for controlling a supervisory signal is interposed in the portion of conductor 5 of the plug-circuit on either hand of the bridge 6. The relay $l$ in circuit toward the plug $f$ is designed to control a supervisory signal referring to that plug, while relay $l'$ in circuit toward plug $f'$ is to control a signal referring to the latter plug. The signals thus controlled are electromagnetic indicators $m$ and $m'$, respectively, which are constructed to display their indicators only when their magnets are excited.

The sleeve-contacts of the plugs, which register with the test-rings $b'$ of spring-jacks, into which they are inserted, form the terminals of conductors of the local circuit referred to in the general description. Thus the sleeve-contact of plug $f$ is connected with a wire 7, leading to the free pole of a grounded battery $n$. This wire 7 includes one of two magnet-windings of the controlling-magnet of signal $m$. A branch 8 from the same pole of the battery is led through the other winding of the same magnet to one contact-point of the relay $l$, whose other contact-point is grounded by wire 9. Similarly wire 10, which includes one winding of signal $m'$, leads from the free pole of the same battery to the sleeve-contact of plug $f'$, while a branch 11 12, including the other winding of the same signal-controlling magnet $m'$, is controlled by the switch-contacts of relay $l'$. The wires 7 and 10, associated with the answering and calling plugs, respectively, are designed to come into circuit with the wires 3, including the magnets $e$ of the cut-off relays of the telephone-lines with which such plugs may be connected. Hence inasmuch as the two windings of each of the signals $m$ and $m'$ are intended to neutralize each other when both windings are excited the windings in wires 7 and 10, respectively, should have more turns than the windings in wires 8 and 11, such that the number of ampere-turns of the two windings of each signal will be equal.

Inasmuch as the general mode of operation of switching-signals controlled from substations of telephone-lines is familiar to those acquainted with the art of telephony, I shall trace the operation of these signals herein only briefly.

The removal of a receiving-telephone from its switch at a substation permits current to flow from the common battery $c$, which excites the line-signal $d$ and indicates a call to the attendant. The operator then inserts an answering-plug $f$ into the spring-jack of the calling-line, at the same time bringing her telephone into connection with the plug-circuit, which then forms an extension of the calling-line to learn the order. The insertion of the plug closes the local circuit 7 3, whereby the cut-off relay $e$ of the calling-line is excited and caused to sever the normal ground connections of the line, while at the same time current is provided in one winding of the supervisory signal $m$. It will be noted, however, that current flowing from battery $k$ through the plug-circuit 4 5 and the line-circuit will simultaneously excite the relay $l$ and cause it to close the local circuit 8 9, whereby the supervisory signal $m$ will be rendered inert, the effect of its windings on the core being differential and equal. The current flowing in the circuit 7 3 produces a difference of electrical potential between the test-rings $b'$ of the spring-jacks of the line with which connection has thus been made and the earth, which serves to indicate the busy condition of the line to an operator subsequently making a test. In making connection with another line in compliance with the subscriber's order the operator inserts plug $f'$ into a spring-jack of the line called for. Thereby the cut-off relay $e$ of that line is excited and severs the ground connections of the line. The circuit 10 3 being closed, current is created in a winding of the supervisory signal $m'$, and the test-rings $b'$ of the line are electrified to a difference of potential depending on the electromotive force of battery $n$ and the resistances in conductors 10 and 3, respectively, in accordance with well-known electrical laws. The operator calls by means of key $g$ in the usual way. In this case, however, the relay $l'$ remains inert until the called party responds to the call by removing his receiving-telephone from its switch. Until that time, then, the circuit 11 12 remains broken and the supervisory signal $m'$ displays its indicator to the operator. The display of this indicator denotes to the operator that the called party has failed to respond and permits her to transmit a second call-signal, if such be needed. The response of the called party, however, by permitting the excitement of relay $l'$ renders the controlling-magnet of the supervisory signal inert and effaces its indication. It will be observed that the operation of the relay $l'$ in no wise affects the difference of potential between the test-rings $b'$ and the earth, so that the busy test of these spring-jacks is of a constant nature. This feature of my invention constitutes an important improvement in the operation of supervisory signals. The breaking of the circuit at either substation by the replacement of the telephone on its switch there is indicated by the supervisory signal $m$ or $m'$, referring to the plug connected with that line. The replacement of both telephones effects the display of both supervisory signals, which may be accepted by the operator as a call for disconnection and may be followed by the removal of the plugs from the spring-jacks of the connected lines.

The invention is defined in the following claims:

1. The combination with telephone-lines having means at their substations for changing the resistance of the line in the use of the telephone, of a supervisory signal with an actuating-magnet having differential windings, each of said windings being in a closed circuit with a source of current, the current through one of said windings being controlled by the said means for changing the resistance of the line, as described.

2. The combination with telephone-lines having means at the stations thereof for diminishing the resistance in the line in the use of the telephone, of a plug and plug-circuit for making connection with a line, a supervisory signal associated with the line, having two windings, a local circuit closed in switch-contacts brought together in making connection with a line, including one of said windings of the supervisory signal, the other winding of the signal being in the circuit of current determined by the diminished resistance of the line in the use of the telephone, said windings of the signal being equal and differentially disposed with respect to the currents in them; whereby the signal is displayed only during connection of the plug with the line, while the telephone of the line is in use, as described.

3. The combination with telephone-lines, each provided at its station with a switch and circuit connections for reducing the resistance of the line during the use of the telephone, and at the central station with a spring-jack, of plugs and a plug-circuit for uniting lines, a source of current connected with the plug-circuit, and a relay in the circuit to each plug, responsive to current in the corresponding line; a supervisory signal with two windings for each plug, a local circuit including one of the windings together with a source of current and registering contacts of the plug and spring-jack adapted to complete the local circuit, and a second circuit for each signal including the other winding thereof, said last-mentioned circuit of each supervisory signal being controlled by the relay in the circuit to the corresponding plug, substantially as described.

4. The combination with a telephone-line, spring-jacks forming multiple terminals thereof, test-contacts for the spring-jacks, and a local circuit of which said contacts form normally open terminals, plugs and a plug-circuit for making connection with the line, a relay in the plug-circuit, and means for operating the relay in response to changes of line resistance, of an electromagnetic instrument having an actuating-magnet with two windings, a local-circuit conductor adapted to be brought into connection with the said test-circuit of the line when connection is made with the line including one of said windings, and another circuit including the other winding of said electromagnetic instrument controlled by switch-contacts of the relay; whereby the action of the said instrument is made dependent on the connection of the plug with the line and on the condition of the relay, while the potential of the test-circuit is made independent of the action of the relay, as described.

5. The combination with telephone-lines having switches and circuit connections at their stations for reducing the resistance of the lines during the use of the telephones, spring-jacks connected in multiple with each line, plugs and a plug-circuit for uniting lines, a source of current in a bridge of the plug-circuit, and a relay in the plug-circuit in the path of current to each line; of a supervisory signal for each plug having a magnet with two windings, a local circuit including one of said windings, together with a source of current, made up in part of a conductor terminating in a contact-piece of the corresponding plug, and a conductor terminating in normally open test-contacts of the spring-jacks of each line, and including a device having resistance permanently associated with the line, and a local circuit including the other winding of each supervisory signal, said last-mentioned circuit being controlled by the relay responsive to current in the same line, as described.

6. The combination of a series of main telephone-circuits, converging from substations to a central station; switching devices at the said central station for connecting the said circuits in pairs for intercommunication between their respective substations; and a current-changing device at the several substations of said main circuits; with a supervisory signal, and a differentially-wound actuating-electromagnet therefor, associated with the said switching devices; the two windings of said magnet (when the said switch devices are in use) being, one, in a circuit whose current is practically constant, and the other in a circuit whose current is variable, and controlled by the operation of the current-changing device of the appropriate substation whose circuit is united with another through the said switch devices; substantially as described.

In witness whereof I hereunto subscribe my name this 10th day of July, A. D. 1901.

CHARLES E. SCRIBNER.

Witnesses:
ELLA EDLER,
DUNCAN E. WILLETT.